Aug. 29, 1961    C. J. LOFGREN ET AL    2,998,001
SWING GRILL
Filed May 9, 1958    2 Sheets-Sheet 1
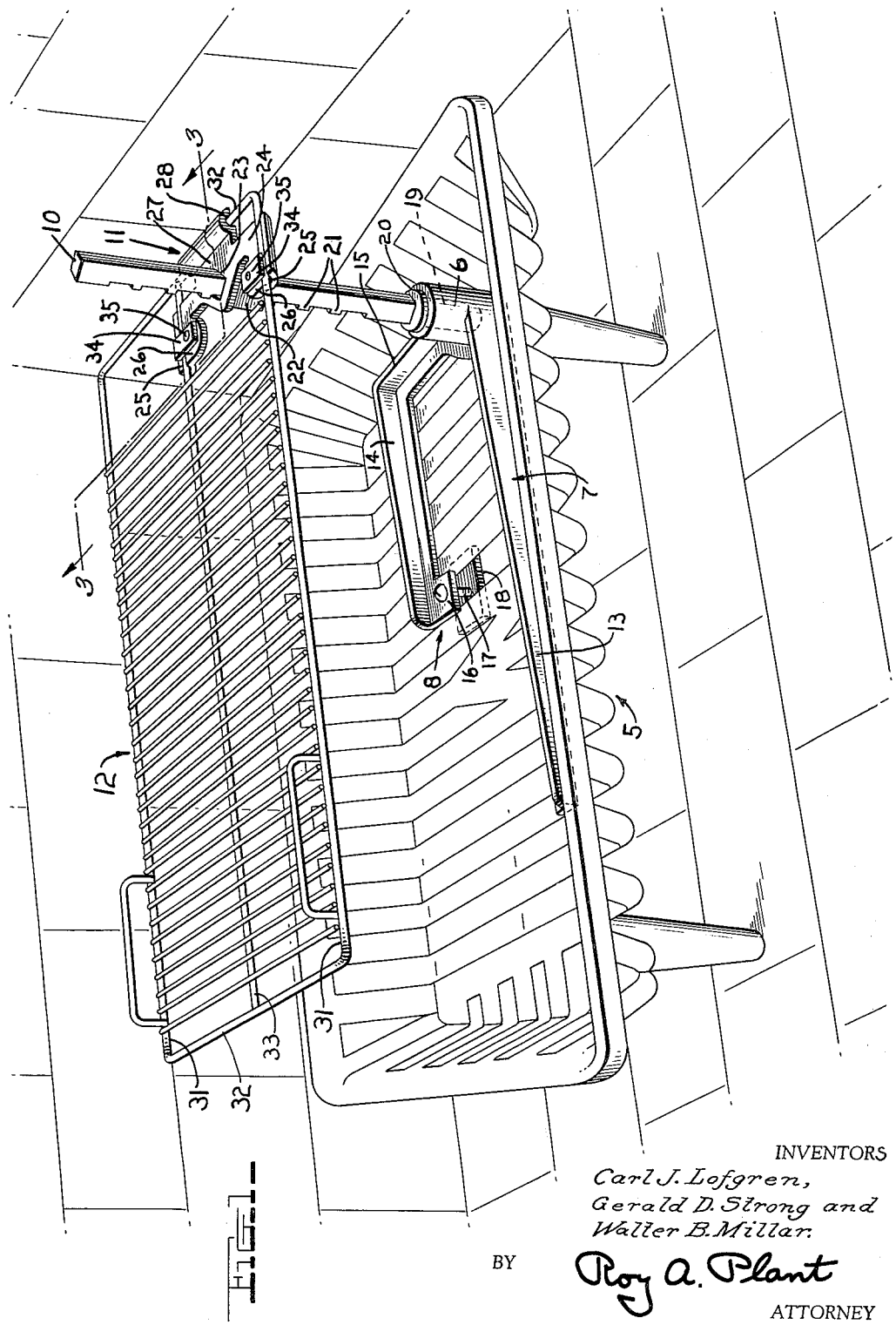
INVENTORS
Carl J. Lofgren,
Gerald D. Strong and
Walter B. Millar.
BY Roy A. Plant
ATTORNEY Aug. 29, 1961 C. J. LOFGREN ET AL 2,998,001
SWING GRILL
Filed May 9, 1958 2 Sheets-Sheet 2
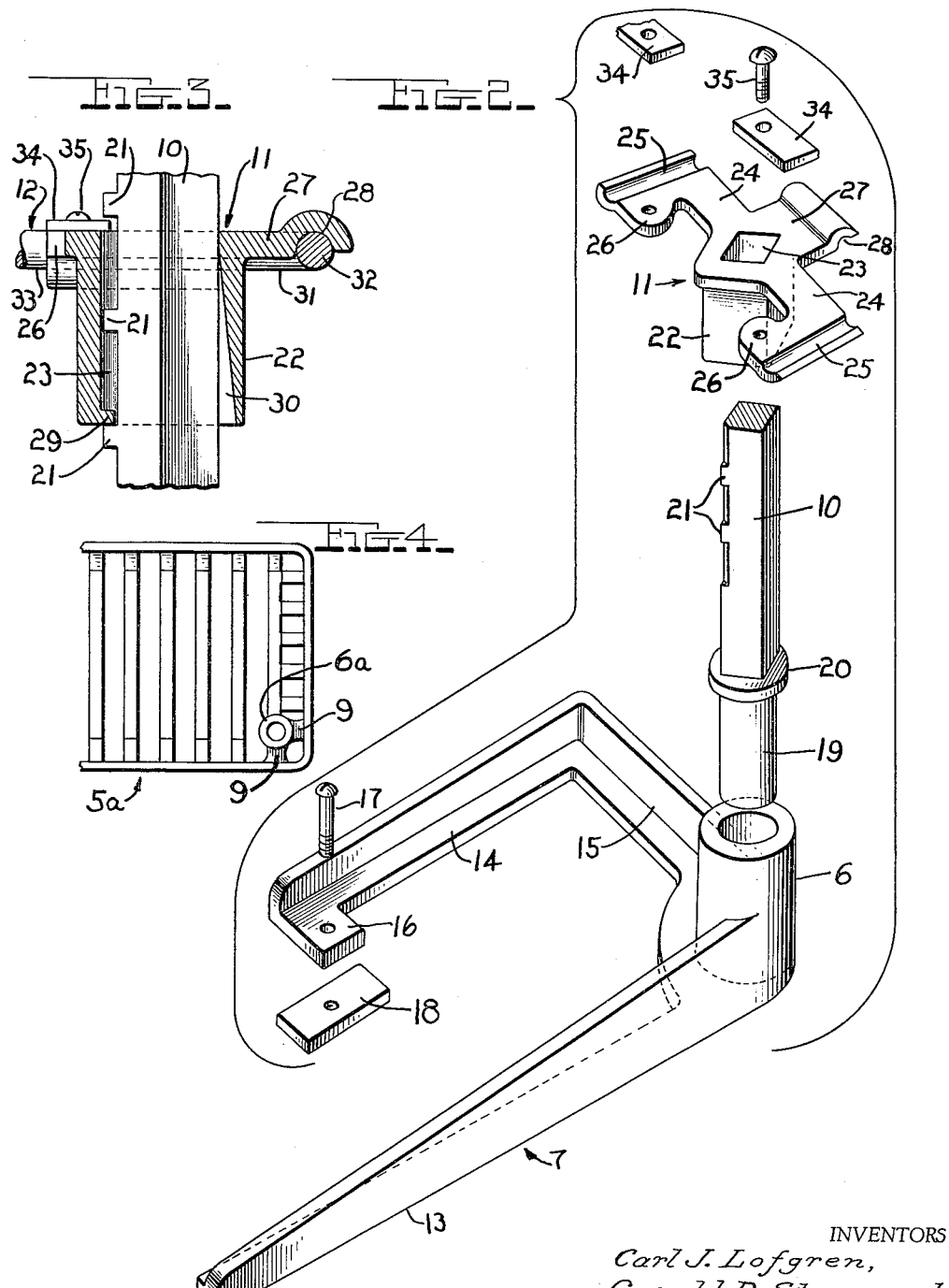
INVENTORS
Carl J. Lofgren,
Gerald D. Strong, and
Walter B. Millar.
BY Roy A. Plant
ATTORNEY

United States Patent Office 2,998,001
Patented Aug. 29, 1961

2,998,001
SWING GRILL
Carl J. Lofgren, Gerald D. Strong, and Walter B. Millar, Battle Creek, Mich., assignors to Battle Creek Foundry Company, Battle Creek, Mich., a corporation of Michigan
Filed May 9, 1958, Ser. No. 734,282
8 Claims. (Cl. 126—25)

The present invention relates broadly to cooking equipment, and in its specific phases to a special form of grill.

Many times one may desire to have charcoal grilled steaks, but due to weather conditions cannot have them even though outdoor grilling equipment is on hand. It was a recognition of this problem and the complete lack of any suitable equipment on the market for use in the home for charcoal grilling steaks, even though the home had a fireplace, which led to the conception and development of the present invention.

Accordingly among the objects of the present invention is the provision of a novel cooking grill including a grate and a grill frame horizontally supported in a novel manner over said grate. Provision is thus made for grilling steaks and the like and for performing other cooking operations indoors, in inclement weather, by utilizing a fire in the basket grate of a fireplace.

Another object of the invention has been to provide a novel and advantageous construction including a post upon which the grill frame is mounted, and means for so mounting said post on a fireplace basket grate that the post and grill may be easily removed from the grate after use.

Another object has been to provide a novel construction in which the aforesaid post is rotatable in a bearing socket carried by the grate, thereby permitting forward swinging of the grill frame to allow the cook to conveniently place the food on said grill frame, swing it back over the grate and give it proper attention during cooking, and swing it out again to remove the food when cooked, all without working directly over the fire at all times and further without danger of burning the hands.

A further object has been to provide a novel base for mounting the aforesaid post, said base being adapted for securing upon the fire supporting bottom of the basket grate and being so constructed that it will not materially interfere with the flow of draught air through the grate.

A still further object has been to provide the post-mounting base of such form that a single screw or bolt will secure it to the bottom of the basket grate and will prevent the grill frame from sagging even though supported at one end only and thus having a cantilever action.

Yet another object has been to provide a novel bracket for mounting the grill frame on the post and holding it in any desired step by step vertically adjusted position.

Still another object has been to provide a construction for grilling which is easy to manufacture, can be easily assembled and operated, and yet is of reasonable cost.

Still another object has been to provide a novel construction permitting easy detachment of the grill frame from the bracket, for cleaning.

Still further objects and advantages of the invention will appear as the description proceeds.

To the accomplishment of the foregoing and related ends, the invention, then, consists of the cooking means hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

FIGURE 1 is a perspective view showing the grill frame in an operative position over a fireplace basket grate.

FIGURE 2 is an enlarged disassembled perspective view of the base, the bracket, and a portion of the post, on which the grill is mounted by means of the bracket.

FIGURE 3 is an enlarged fragmentary sectional view as taken on line 3—3 of FIGURE 1, looking in the direction of the arrows.

FIGURE 4 is a fragmentary top view on a reduced scale, showing a modified construction in which the post socket is incorporated as an integral portion of the basket grate.

In FIGURE 1, one form of basket-type fireplace grate 5 is shown. On one end of this grate 5 an upwardly open socket or journal means 6 is supplied by means of a base frame 7 secured at 8 upon said grate, said socket being a unit part of said base frame.

In FIGURE 4, a similar grate 5a is shown having a socket or journal means 6a rigidly connected therewith, said socket 6a being shown as an integral part of the grate and joined at 9 to same.

Either socket 6 or 6a is preferably located in one front corner portion of the grate, and is of sufficient height to normally extend above the ashes and debris which accumulate in the grate under conditions of use. In any case the socket is preferably open at its bottom to facilitate keeping same clear at all times ready for reception of post 10.

While both basket grates 5 and 5a are intended primarily for indoor use within a fireplace, either of these grates or a similar grate equipped with a socket such as 6 or 6a could of course be used out of doors, at the home, at picnic grounds, or elsewhere.

A post 10 is engaged removably and rotatably with the socket 6 or 6a and carries a vertically adjustable support bracket 11. This bracket supports a grill frame 12 in cantilever manner at one end, and due to the rotatability of the post 10, this grill frame may be easily swung from an operative position over the grate, to a forwardly projecting position for loading and unloading, and vice versa.

The base frame 7 preferably comprises a relatively long horizontal front arm 13, a comparatively short horizontal rear arm 14, and an arm-connecting portion 15 which integrally joins said arms 13 and 14 at one end of same. The socket 6 is integral with arm 13 and arm-connecting portion 15, and is preferably located at the juncture of these two elements. The free end of the short rear arm 14 has an apertured lug 16 through which a bolt or screw 17 extends to coact with a subjacent clamping plate 18 in securing the entire frame 7 upon the grate. This single bolt or screw is adequate, and due to its location, it will hold and stabilize the frame 7 and post 10 against being moved by the cantilever action exerted by the grill frame 12 due to normal loading of food on same, whether this frame be over the grate or be forwardly swung from said grate.

The post 10 may be of polysided form, and preferably is of square cross section, but is provided with a cylindrical lower end 19 for reception and rotation in the socket 6 or 6a, and with a stop flange 20 for limiting the extent of insertion into the socket. This flange 20, or other equivalent stop, would be unnecessary if the lower end of the socket were totally or partially closed, but it is preferable that the bottom end of said socket be open to prevent any possible accumulation of ashes and the like in the socket. One corner portion of the post 10 is shown as cut away at intervals to provide it with vertically spaced teeth 21, but equivalent teeth could well be provided in any other suitable way.

The bracket 11 which engages post 10 and acts as a support means for grill 12, embodies a hub 22 having a polysided opening 23 slidably receiving the post 10. Two lateral arms 24 are integral with the upper end of the hub 22 and project in opposite directions therefrom. The outer ends of these arms 24 are widened and provided with parallel upwardly open channels 25 and preferably with apertured ears 26. A short third arm 27 projects from the upper end of the hub 22 in a direction at a right angle to the arms 24, and opposite to the main cantilevered projection of grill frame 12; and the outer end of this arm 27 is provided with a downwardly open channel 28 the lengthwise direction of which is at right angles to the lengths of the upwardly open channels 25.

The lower end of the hub 22, FIGURE 3, has a suitable internal lug 29 adapted to rest on any of the teeth 21, to mount the bracket 11 at any desired height. Teeth 21 and internal lug 29 thus form detachably engageable abutment means permitting adjustment of bracket 11 longitudinally of post 10. The bracket must be angled against the cantilever action of the grill frame 12, in order to release the lug 29 from any tooth with which it is engaged; and to permit such angling, the opening 23 of bracket 11 is downwardly and outwardly enlarged at 30 opposite said lug 29.

The grill frame 12 includes parallel longitudinal side rods 31, end rods 32, and an intermediate longitudinal rod 33 joined to said end rods 32 in conventional manner, such as by welding. One of these end rods 32 is received in the downwardly open channel 28 of the bracket 11; and portions of one of the side rods 31 and intermediate rod 33 lie in the upwardly open channels 25 of said bracket 11. The cantilever action of the grill frame 12 could thus be alone relied upon to hold said frame 12 engaged with the bracket 11, but it is preferable to provide the bracket with the ears 26 and to secure clamp plates 34 to said ears 26 by means of screws 35. In either instance, the grill frame 12 may be readily detached from the bracket 11 for cleaning.

It will be seen from the foregoing that a novel and advantageous construction has been provided for attaining the desired ends either as an attachment or as an inbuilt construction so far as the socket is concerned. When the base frame 7 is employed, it may be easily secured to the grate and need not be later detached therefrom, as the bracket 11 carrying the open work grill frame 12 may be readily lifted from the post 10 and this post then easily lifted from the socket 6, after each use of the invention. Then, the grill frame 12 may be easily detached from the bracket 11, if desired, for cleaning. Whether the grate be provided with the frame-carried socket 6, FIGURE 1, or with the integral socket 6a, FIGURE 4, the same advantages exist with respect to removal of the post and grill elements after use. Then, too, the advantages of being able to swing the grill frame 12 forwardly from the grate for loading and unloading, and being able to adjust said grill frame to different heights, depending upon heating requirements, are attainable with either form of construction.

While preferences have been disclosed, and rather specifically described, attention is again invited to the possibility of making variations within the spirit and scope of the invention as shown and described.

Other modes of applying the principle of our invention may be employed instead of those explained, change being made as regards the grilling apparatus herein disclosed, provided the means stated by any of the following claims or the equivalent of such stated means be employed.

We therefore particularly point out and distinctly claim as our invention:

1. A grill comprising a substantially horizontal fire grate, vertically disposed journal means on said grate, a post including a lower end portion removably and rotatably engaging said journal means for permitting rotation of said post about its longitudinal axis, a support bracket having a transverse opening slidably received on the upper portion of said post, said upper portion of said post and opening in said bracket having a cross-section other than circular whereby rotation of said bracket in a horizontal plane causes simultaneous rotation of said post and bracket and the lower end of said post in said journal means, said bracket and post including cooperating detachably engageable abutment means permitting said bracket to be vertically adjusted longitudinally of said post, and a grill frame removably mounted on said bracket for cantilever disposition above said grate in overlying or offset relation thereto, said grill frame including at least two spaced side rods and a transverse end rod, said support bracket having portions including a pair of spaced channels opening in a direction to removably receive and support therein the under side of said side rods of said grill frame at one end of same, said bracket also having an intermediate portion including a transverse channel disposed between said side rods resting in said pair of spaced channels and at the side of said post remote from the cantilevered major portion of said grill frame and removably receiving and supporting the upper side of said end rod of said grill frame therein, said transverse opening of said bracket for receiving the upper portion of said post being normal to a plane including said pair of channels and located substantially between said pair of spaced channels and spaced a short distance from said transverse channel.

2. The structure of claim 1; said grate journal means comprising an upwardly opening socket having a cylindrical cross-section, said post including a lower cylindrical cross-section portion complementary to that of said socket and rotatable therein, said socket being disposed adjacent one end of said grate.

3. The structure of claim 2; wherein said socket portion of said grate journal means comprises an integral portion of said grate.

4. The structure of claim 2; wherein said socket is a portion of an integral base frame extending normal to the longitudinal axis of said post and substantially parallel to the bottom of said grate and the frame of said grill, said base frame including one elongated arm substantially underlying said grill frame beneath one of said side rods, said base frame also including a second elongated arm substantially parallel to said one arm, and a single clamp means on one of said arms detachably engaging said base frame with said grate.

5. The structure of claim 1; said transverse opening in said support bracket having a sufficiently larger transverse dimension than said post, and particularly the lower portion of said transverse opening, for permitting said bracket to be tilted upward angularly, at the side of same adjacent the cantilevered portion of said grill, relative to the longitudinal axis of said post, said cooperating abutment means on said post comprising a plurality of longitudinally spaced teeth extending away from said end rod of said grill frame, the cooperating abutment means on said support bracket for said grill comprising a lug projecting laterally into the transverse opening of said support bracket, said larger transverse dimension of said support bracket opening being at the opposite side of said opening from said lug so as to facilitate cantilever action of said grill and support bracket for adjusting the position of said bracket on said post.

6. The structure of claim 1; said grill supporting pair of spaced channels opening upwardly and said transverse channel opening downwardly.

7. The structure of claim 1; said support bracket including horizontally displaceable clamp plate means positionable transversely over said pair of spaced channels and said side rods disposed therein, whereby said grill is anchored to said support bracket.

8. A grill comprising a fire grate, a post having an upper portion of polysided form rising from said grate, said post having a cylindrical lower end, a socket including means fixedly mounted on said grate and rotatably receiving said cylindrical lower end of said post, means supporting said cylindrical lower end portion of said post on said socket including means with said post both removable and freely rotatable therein, a bracket having a polysided opening through which the upper portion of said post extends slidably, cooperating means on said post and said bracket for supporting said bracket in vertically adjusted positions on said post for rotation therewith, a grill frame mounted on and extending in cantiliver manner from said bracket, said grill frame having at least two spaced longitudinal rods and an end rod secured to said longitudinal rods, said supporting bracket extending from one of said longitudinal rods to the other and disposed near said end rod, said bracket having two upwardly opening channels in said extending portions thereof and in which said longitudinal rods are seated and supported, said bracket also having another extending portion with a downwardly open channel in which said grill frame end rod is seated and supports the cantilever portion of said grill frame, said polysided opening being located between said upwardly open channels of said bracket.

References Cited in the file of this patent

UNITED STATES PATENTS

| | | |
|---|---|---|
| 742,210 | Moreland | Oct. 27, 1903 |
| 758,015 | Miller | Apr. 19, 1904 |
| 903,302 | Moore | Nov. 10, 1908 |
| 1,226,771 | Hutchinson | May 22, 1917 |
| 1,384,250 | Froom | July 12, 1921 |
| 1,967,455 | Summers | July 24, 1934 |
| 2,522,223 | Hardin et al. | Sept. 20, 1950 |
| 2,553,960 | Swart | May 22, 1951 |
| 2,774,562 | Henry | Dec. 18, 1956 |
| 2,794,496 | Strand | June 4, 1957 |
| 2,868,189 | Watrous | Jan. 13, 1959 |
| 2,893,373 | Rundle | July 7, 1959 |

FOREIGN PATENTS

| | | |
|---|---|---|
| 18,972 | Great Britain | 1889 |
| 93,149 | Sweden | Oct. 31, 1938 |
| 197,598 | Great Britain | May 17, 1923 |
| 224,297 | Great Britain | Nov. 10, 1924 |
| 361,068 | Great Britain | Nov. 19, 1931 |
| 536,077 | Great Britain | May 1, 1941 |
| 543,974 | Great Britain | Mar. 17, 1942 |
| 578,181 | Great Britain | June 18, 1946 |